Sept. 15, 1942.                F. PLATE                  2,296,049
                          OYSTER OPENING DEVICE
                          Filed April 26, 1939
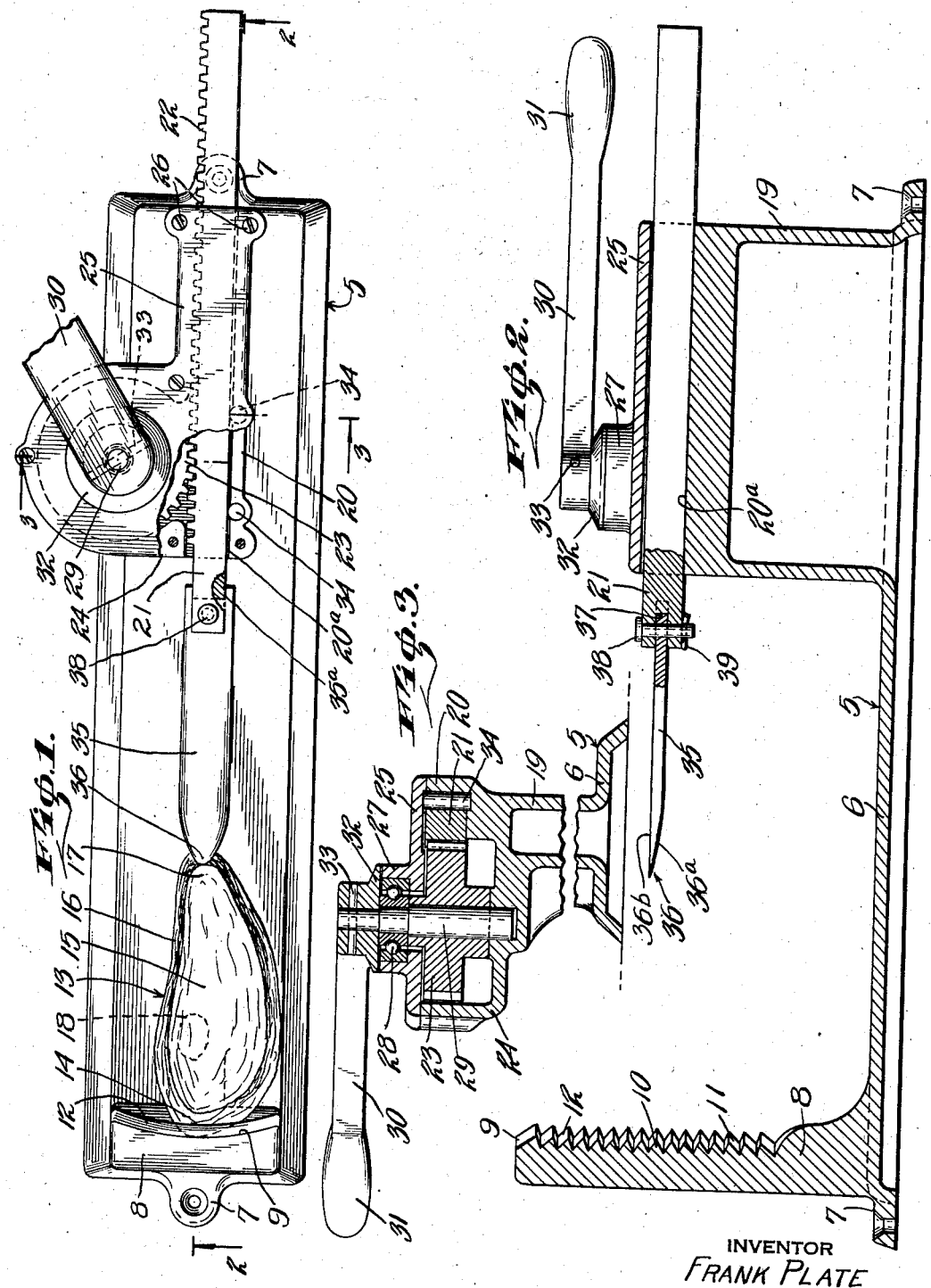
INVENTOR
*Frank Plate*
BY
*Howard E. Thompson*
ATTORNEY Patented Sept. 15, 1942

2,296,049

UNITED STATES PATENT OFFICE 2,296,049

OYSTER OPENING DEVICE

Frank Plate, Mineola, N. Y.

Application April 26, 1939, Serial No. 270,094

2 Claims. (Cl. 17—9)

This invention relates to a device or apparatus for use in opening oysters, clams and the like, and the object of the invention is to provide a device of the class described comprising a concaved and tooth surfaced backing member for engaging one end portion of a clam or the like, and means in spaced relation to said member for supporting and operating a blade or tool toward the backing member to engage an opposed end portion of an oyster or clam to separate the shells of the product to facilitate serving the same on the half shell or removal of the oyster or clam for other uses; a further object being to provide means on the backing member compensating for irregularities in the contour of an oyster; a further object being to provide means for detachably supporting the knife or tool to facilitate replacement or renewal thereof; a further object being to provide an elongated rack for supporting the knife or tool with means cooperating with the rack for moving the same toward and from the backing member; a still further object being to provide antifrictional means for backing and guiding this blade supporting rack in its movement longitudinally through its support, and with these and other objects in view the invention consists in a device or apparatus of the class and for the purpose specified which is simple in construction, efficient in use, and which is constructed as hereinafter descibed and claimed.

Fig. 1 is a plan view of the device made according to my invention with part of the construction broken away and in section.

Fig. 2 is a longitudinal section substantially on the line 2—2 of Fig. 1 of the drawing.

Fig. 3 is a cross section substantially on the line 3—3 of Fig. 1 with part of the construction broken away.

In the art of opening oysters and clams hand methods of performing this operation are most extensively used. In this operation it has not only been a difficult and tedious one but also an operation which has been hard upon the hands of the operator and has caused injuries to the operator. It is the purpose of my invention to provide a simple and economical form of device, which will perform the desired operation in substantially the same manner or mode of procedure as followed by the conventional hand operated means, but which will perform the desired operation with a minimum amount of effort and substantially eliminate wear and tear upon the hands and the danger of injury to the hands. By constructing a device or apparatus in the simple and economical manner disclosed this device or apparatus becomes available to the smallest restaurant while also serving its purpose in the most elaborate restaurant. In addition to saving in the manual effort to perform the desired function it has been found from actual experience and use that the desired operation can be performed at a much greater speed thus facilitating by more prompt service or delivery of the products in question. It will, of course, be apparent that in addition to the restaurant use the invention is also applicable for use in various stores selling clams and oysters removed from the shell in the service of chowders, stews, fried oysters and many other preparations of the food products in question.

For the purpose of illustrating one adaptation of my invention I have shown in the accompanying drawing a device consisting of a unitary frame 5 which may be made in the form of a casting, and different types of metals may be employed, and if weight is a factor such material as aluminum may be used. In the construction shown this frame comprises an elongated base 6 terminated at its ends in apertured lugs for the reception of screws, bolts or other securing devices for attaching the device to a table, bench or other support. At this time it will be understood that the device may also be used as a portable device and attachment to a support is not essential. Extending perpendicularly at one end of the frame 5 or the base 6 thereof is a substantial backing member 8 having a concavely curved inner surface 9 and this surface is provided centrally with a series of straight teeth 10, below which there are upwardly extending teeth 11, and above which there are downwardly extending teeth 12. The purpose of these different teeth is to accommodate irregularities in the contour or curvature of oysters, one of which is indicated at 13 in Fig. 1 of the drawing, and especially for the reception of the bill ends 14 of oysters which at times curve downwardly, other times curve upwardly and in some instances are straight. At 15 is indicated the relatively flat top shell of the oyster and at 16 is shown the peripheral edges of the cup shaped bottom shell, in other words the shell which is utilized in the serving of oysters on the half shell. At 17 is shown the hinge end of the oyster and at 18 is indicated in dotted lines the location of the muscle portion of the shell to which the oyster is attached.

At the other end portion of the frame there is an upwardly extending casing portion 19 having at its upper end an elongated guide 20 and a tool supporting and operating rack 21. The rack 21 has a series of gear teeth 22 arranged longitudinally at one side thereof for engaging a gear 23 supported in a gear case extension 24 at one side of the upper end portion of the casing 19 as is clearly illustrated in Figs. 1 and 2.

The gear case 24 as well as the guide 20 opens through the upper surface of the casing 19 and a cover plate 25 of the general contour of the guide 20 and gear case 24 is secured in position by a series of screws as indicated at 26, Fig. 1 of the drawing. The cover plate has an upwardly protruding sleeve portion 27 in which is arranged a suitable antifriction bearing 28 to provide free rotation of a shaft or spindle 29 in the case 24 together with the gear 23 which is secured to said spindle. At 30 is shown a long operating handle having an enlarged hand grasp 31 at its outer end and the inner end of which is provided with an enlarged hub portion 32 fitting over and concealing the bearing 28 and pinned or otherwise secured to the spindle 29 as seen at 33.

It will be understood that the rack 21 is mounted for free movement longitudinally of the channel 20a of the guide 20. Arranged in the outer wall of the channel are two antifrictional rollers 34 which provide a backing for the rack 21 where the thrust of the gear 23 is applied to the rack so as to provide free movement of the rack longitudinally of the channel 20a in advancing a knife or tool 35 from the position shown in Figs. 1 and 2 in the direction of the backing member.

The tool 35 has a pointed end 36 which is also sharpened by beveling one side as indicated at 36a, the upper side being flat as seen at 36b of the drawing, so that the pointed end 36 of the knife or tool may freely enter the hinge end 17 of the oyster between the upper and lower shells, 15 and 16, and then pass along the inner surface of the top shell and sever the muscle 18 joining the oyster to the top shell. The blade is preferably of sufficient width to insure severing of the muscle in one operation. It will also be apparent that clearance is provided for the rack 21 to permit slight vertical movement of the blade. This vertical movement permits the blade to "feel" its way into the hinge of the oyster thereby preventing undesirable chipping.

In the process of removing said top shell in this operation, it will be understood that the oyster is held in the palm of one hand with the bottom shell arranged downwardly while the other hand is utilized to grasp the handle 30 to move the same in the direction of the backing 8 so as to advance the knife or tool 35 as will be apparent. It is well to be noted that the usual relative operation of the hands is maintained, the only real difference being that the knife or tool 35 is not directly held in the hand and extreme power can be put behind the knife, by virtue of the leverage, in operating the same through the long handle 30.

It is preferred that the knife or tool 35 be detachably supported in connection with the rack 21 and while this may be accomplished in numerous ways one simple form of construction is shown which comprises forming a channel 37 in the end of the rack 21 and forking the inner end of the knife 35 as seen at 35a so as to receive the rack 21 just inwardly of the channel 37 as is illustrated in Fig. 1 of the drawing. The fork end portion of the knife 35 as well as the channeled end portion of the rack 21 will be apertured to receive a coupling pin or bolt 38 and in the construction shown this pin is held in position by a pin 39.

It will, of course, be understood that while the device or apparatus in the accompanying drawing has been shown as of a unitary construction, that is to say, the case part 19 is an integral part of and joins the backing 8 in the elongated base 6, this is not absolutely essential. Many other adaptations of the blade operating part may be employed and this is especially true in adapting the device for use in opening clams as well as oysters, where the relative adjustment of the parts may be varied. Of course, different types and styles of the device or apparatus may be made for the different uses, but in most instances the one machine will be adaptable for all uses. It is desirable that the blade or knife 35 be moved toward and from the backing 8 in alinement with the vertical center of the concaved surface 9 of the backing and this surface is made sufficiently wide to compensate for not only large oysters and clams but also to prevent displacement of the oyster or clam from the backing when the pressure of the knife is applied in the operation of removing one of the shells. In some instances, and especially with oysters of very irregular contour, the knife or blade 35 may be started or introduced into the hinge of the oyster while the oyster is held in an angular position with respect to the blade; and thereafter, and before completing the advanced movement of the knife, the position of the oyster may be changed by simply drawing back on the blade sufficiently to reengage the bill end of the oyster with another tooth of the backing 8, maintaining the oyster on the pointed end 36 of the blade in this operation.

It will be understood that prior to serving the oyster or clam on the half shell another hand knife will be used to sever the oyster or clam from the muscle of the lower shell.

The knife support and operating rack may well be termed a plunger which is movable toward and from the backing member and this plunger with the knfie thereon is arranged substantially centrally with respect to the vertical dimensions of said backing member.

Having fully described my invention, what I claim as new and desire to secure by Letters Patent is:

1. In a shell separating device of the class describing employing a reciprocating knife, a backing member arranged in spaced relation to and in alinement with the path of movement of said reciprocating knife, said member having a vertically disposed and cylindrically concave surface exposed to the path of movement of said knife, said concave surface having a multiplicity of transverse V-shaped grooves, the upper and lower walls of the V-shaped groove in alinement with the blade being disposed at substantially the same predetermined angle with respect to said vertically arranged surface, the lower walls of the grooves below said blade and the upper walls of the grooves above said blade being disposed at angles progressively greater than said predetermined angle, and the opposite walls in each case being disposed at angles progressively smaller than said predetermined angle thereby forming means for positively supporting a shell engaged by said blade in any angular position thereof with respect to said backing member.

2. In a shell separating device of the class described employing a flat reciprocating knife having a bluntly tapered and upwardly beveled cutting end, a backing member arranged in spaced relation to and in alinement with the path of movement of said reciprocating knife, said backing member having a vertical cylindrically concave surface exposed to said knife, said surface having a multiplicity of transverse V-shaped grooves, the side walls of the groove in alinement with said knife being disposed at an equal angle with respect to the path of movement of said knife, and the side walls of grooves above and below said first named groove being disposed at progressively varied angles whereby the walls of each groove form substantially uniform angles with respect to a line extending from said groove to the knife end when arranged in approximate position for engagement with a shell.

FRANK PLATE.